April 26, 1932. W. G. HOELSCHER ET AL 1,855,882
REVERSING GEAR AND CLUTCH MECHANISM
Filed Oct. 28, 1930 4 Sheets-Sheet 4
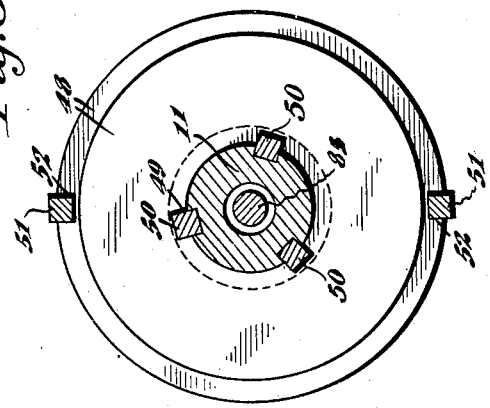
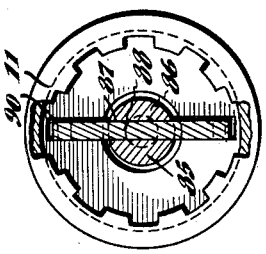
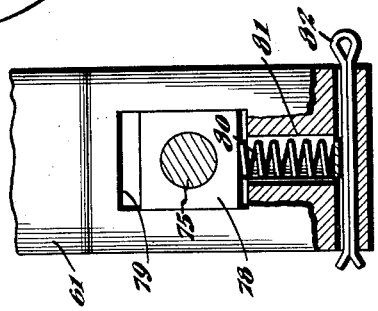
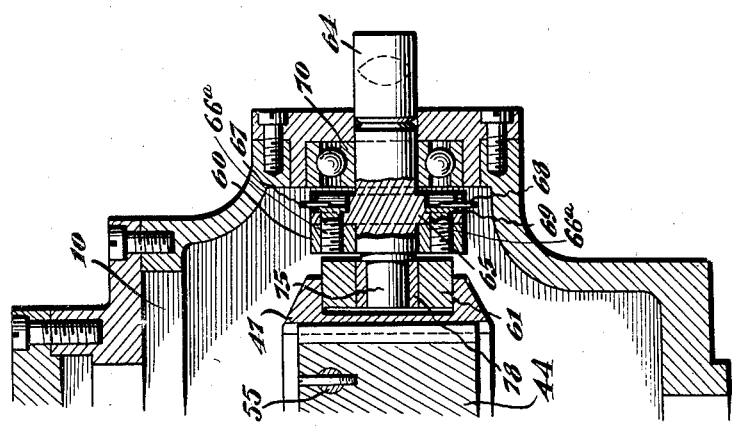
INVENTORS
William G. Hoelscher
BY Robert L. Williamson
Wood & Wood ATTORNEYS Patented Apr. 26, 1932

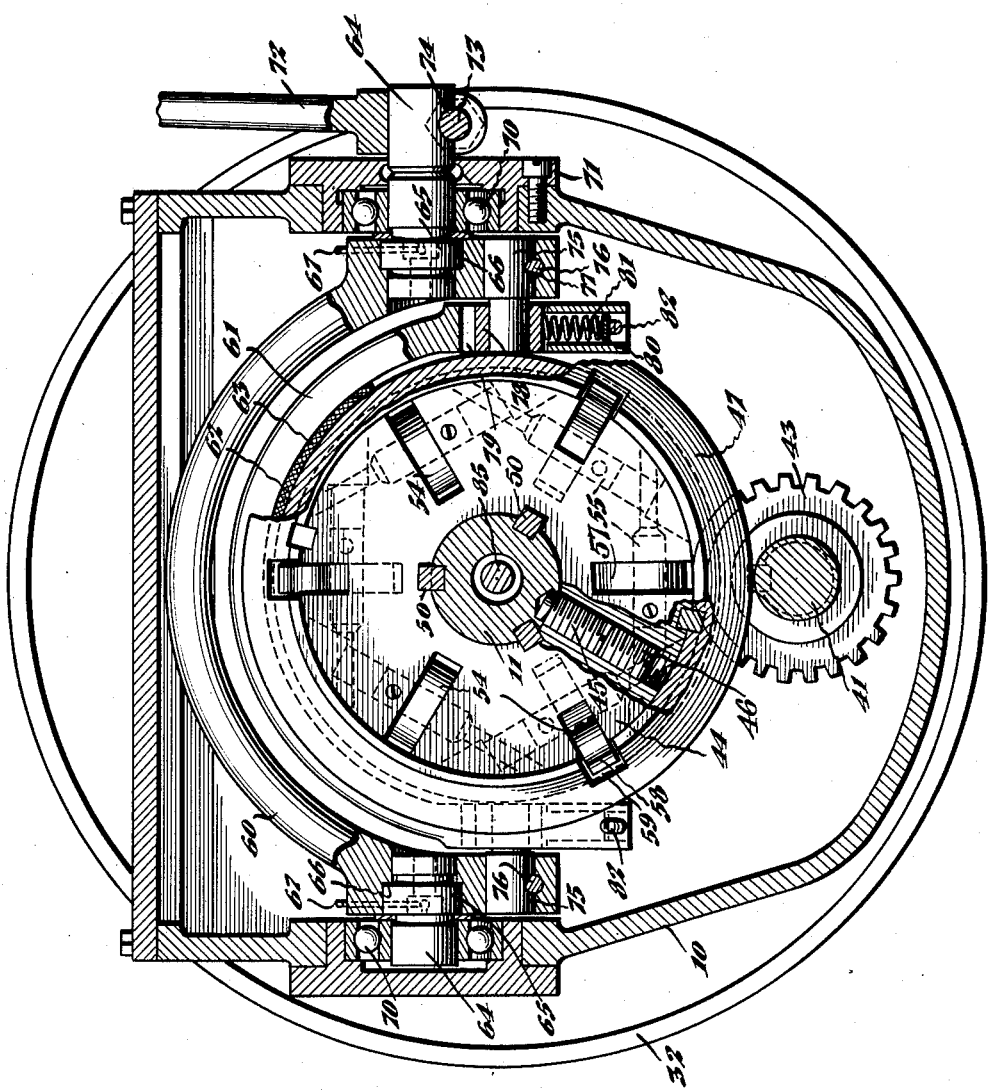

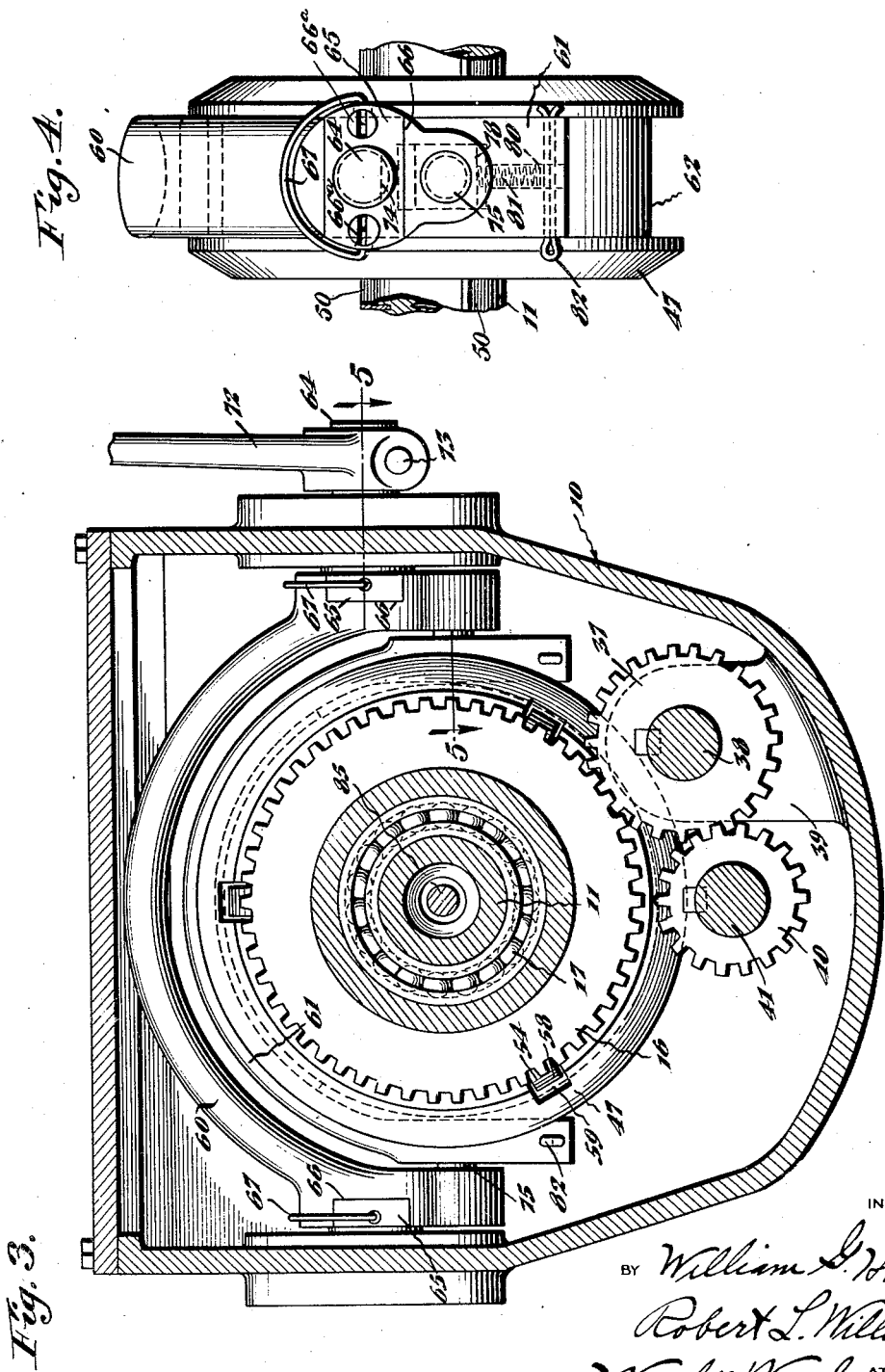

1,855,882

UNITED STATES PATENT OFFICE

WILLIAM G. HOELSCHER, OF NORWOOD, AND ROBERT L. WILLIAMSON, OF CINCINNATI, OHIO, ASSIGNORS TO THE AMERICAN TOOL WORKS COMPANY, OF CINCINNATI, OHIO, A CORPORATION OF OHIO

REVERSING GEAR AND CLUTCH MECHANISM

Application filed October 28, 1930. Serial No. 491,747.

This invention relates to a reversing gearing mechanism of that type wherein friction clutches are included for coupling the power to a transmission shaft by alternate clutch connection to reversely rotating driving gears.

It is an object of this invention to provide an improved friction clutch disposed between the reversely rotating driving gears which is effective for frictionally joining friction disc elements or driving plates, disposed between the leverage means of the clutch and respective gears against the gears, and wherein means is provided for easily operating the clutch levers for effectively frictionally engaging the clutch plates against the gears.

It is another object of the invention to mount the clutch support mechanism as a fixed part of the driven shaft and to dispose this mechanism between the driving gears whereby the clutch support mechanism may be readily adjusted in either direction to locate the same exactly intermediate the gears for a uniform application of pressures to either set of clutch plates at the respective sides of the clutch mechanism.

Another object is to provide an improved clutch mechanism located in the above manner including levers actuated through the medium of a sliding clutch element and operable in sets in the respective directions for effecting the clutching to the desired gear and for permitting a release of the shifting or operating lever for the sliding clutch element, when the clutch position has been assumed, without accidental return of the clutch to neutral or intermediate position.

Another object of this invention is to provide a brake mechanism associated with the clutch shifting means for applying a brake to the driven shaft at the intermediate or neutral clutch position between the reverse drive positions. The purpose of this braking mechanism is to permit a rapid shift from one direction of imparted rotation to the other direction without damage to the clutch mechanism. This purpose is achieved by braking the momentum or uncoupled rotation of the driven shaft after a particular direction of drive has been disconnected bringing the shaft to a full stop as the lever is passed through neutral position to engage the clutch on the opposite side for a reverse drive. A further purpose of the brake is to hold the driven shaft firmly against rotation when the clutch is in neutral position. This function is to offset any tendency of the clutch plates to drag the stationary elements into motion under the centrifugal forces imparted by the rapidly rotating driving gears.

Another object arising from the foregoing is to provide a braking mechanism which may or may not be co-operated with the clutch shifting mechanism, wherein the brake is applied gradually and under spring pressure, the pressure of application being the greatest at exactly intermediate or neutral position.

Another object of this invention is to provide adjusting devices for adjusting the clutch for uniform application of pressure for either direction of drive, and for adjusting the clutch mechanism to accommodate for wearing of the clutch plates.

Another object arising from the foregoing object is to dispose the adjusting devices for the clutch at a common and readily accessible point in the mechanism.

Other objects and certain advantages will be more fully apparent from the description of the accompanying drawings, in which:

Figure 2 is a sectional view taken on line 2—2, Figure 1, illustrating the clutch shifting means and co-operated brake applying means.

Figure 3 is a sectional view taken on line 3—3, Figure 1, illustrating the intermediate gearing for reversing the direction of rotation of one of the driving gears.

Figure 4 is an end elevation of the shifting levers showing the shiftable clutch element in relation thereto.

Figure 5 is a sectional view taken on line 5—5, Figure 3, further illustrating the clutch shifting mechanism and brake applying means associated therewith.

Figure 6 is a sectional view taken on line 6—6, Figure 1, illustrating the connection of the adjusting means to the sleeve.

Figure 7 is a fragmentary view, partly in section, illustrating the mounting of the pivot pins for the inner shifting yoke for permitting a gradual and spring pressure application of the brake.

Figure 8 is a sectional view taken on line 8—8, Figure 1, illustrating the clutch friction plates and their connections to the gear and to the driven shaft.

Figure 1:
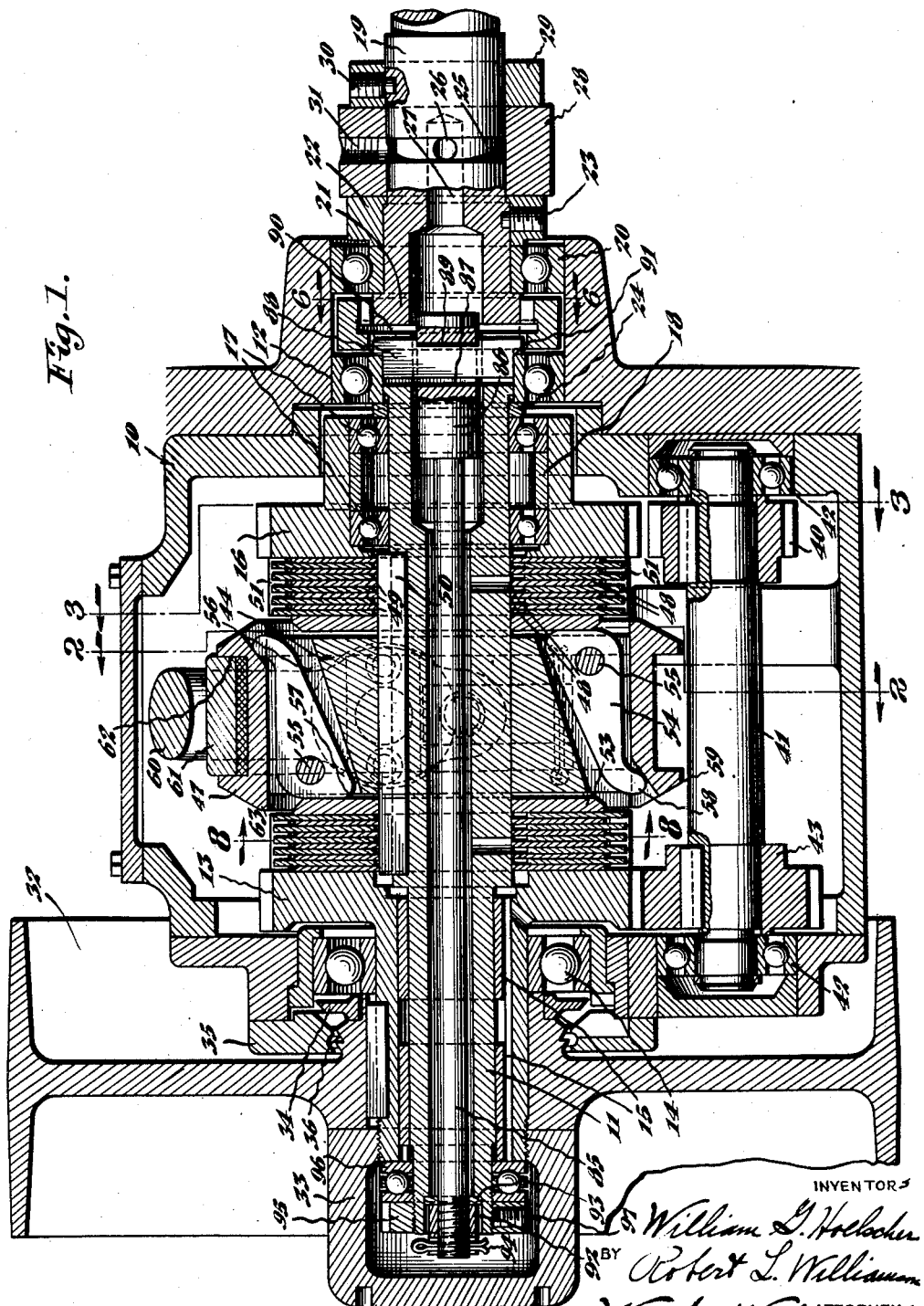
Figure 1 is a sectional view taken longitudinally of the axis of rotation of the various parts of the reversing gearing for generally illustrating the same.

The driving parts for the present mechanism consist of a pair of gears rotatably mounted, one of which is directly driven by means of a pulley and the other of which is driven from the first through an intermediate gear train for reversing the direction of drive thereto. A driven shaft is provided and a clutch is associated with the mechanism between the gears for selectively connecting the gears to the driven shaft. The means for shifting the clutch also operates a brake mechanism for breaking the momentum of the driven shaft after the drive has been disconnected. Clutch adjusting means are provided at a common and conveniently accessible point in the mechanism.

*Mounting and relation of driving and driven elements*

Referring to the drawings, the casing or housing for the reversing gearing is indicated at 10. This casing is of fabricated construction depending upon its relation to the particular environment in which it is designed to transmit power. Its opposite walls are suitably apertured for journalling a driven shaft 11 extending through the casing. This driven shaft is of tubular or sleeve form and is mounted at one end in a ball bearing 12 located within one end wall and at its opposite end extends loosely through a driving gear 13, which gear is rotatably mounted thereon and has a bearing hub journalled within a ball bearing 14 suitably secured within the wall of the casing.

The driving gear 13 is loosely rotatably mounted relative to the driven shaft upon bearing sleeves 15—15 disposed about the driven sleeve or shaft. The hub of the gear 13 extends beyond the confines of the casing and the gear is located within the casing. A second driving gear 16 or reversely driven gear of the reversing gearing is loosely rotatably mounted upon the driven shaft through the medium of ball bearings 17—17 spaced apart by means of a spacer sleeve 18, these bearings and sleeve being disposed within a counter bored portion of the gear 16. The driving gears 13 and 16 are spaced apart on the driven sleeve and the clutching mechanism is located on the driven sleeve between these gears for alternately clutching the same to the driven sleeve. The hub of the gear 16 is loosely disposed within the bore in the end wall of the casing. The drive is delivered from the last mentioned end of the driven sleeve by means of a shaft section 19 coupled to the driven sleeve. This driven shaft section enters into the casing end wall and is mounted therein within a ball bearing 20, the shaft section including a headed end 21 having teeth about its periphery and abutting the inner side of the ball bearing 20.

A collar 22 is secured against the outer side of the bearing and is held in place by means of a set screw 23. The adjacent end of the driven sleeve is flared and includes internal teeth meshing with the peripheral teeth of the headed end of the driven shaft section 19.

The gear 16 is maintained in position against longitudinal displacement outwardly along the driven sleeve by means of a small spacer sleeve 24 disposed about the driven sleeve between a bearing 17 of the gear and the bearing 12 of the driven sleeve. This sleeve 24 prevents the aforesaid displacement when the clutch plates at the inner side of the gear are moved against the gear as will be hereinafter described. The other gear 13 is also maintained against outward displacement. The means for definitely positioning this gear is associated with the means for adjusting the clutch and will be described in relation thereto.

The driven shaft section 19 connected to the driven sleeve 11 includes an annular groove 25 beyond the confines of the casing wall, which groove is connected by radial passageways 26 to a central longitudinal bore 27 extending toward the end of the shaft section 19 and widening toward the outer end thereof. An oiling collar 28 is disposed about the shaft covering this annular groove and is held in place against the retaining collar 22 previously described by means of a second collar 29 held in place on the opposite side of the oiling collar by means of a set screw 30. The oil conduit (not shown) is connected to this oiling collar through a radial passageway 31 in the collar registering with the annular groove for the purpose of supplying oil through the annular groove, radial passageways, and axial bore to the interior of the casing and the bearings thereof.

The first mentioned driving gear 13 or the one at the opposite end of the casing from the shaft section 19 extending to the parts to be driven has a driving pulley 32 keyed to the sleeve hub thereof and held in place against the inner race of the bearing 14, mounting the gear 13, by means of a cap 33 screwed on the hub of the gear and abutting the pulley hub. This cap also functions as a cover for the clutch adjusting means.

An oiling ring 34 is secured to the hub of the pulley at the end adjacent the ball bearing and a cover plate 35 is attached to the casing over this oiling ring, there being special grooves 36 cut in the hub of the pulley and adjacently in the bore of the cover plate for preventing leakage of the oil from the region of the ball bearing.

For one direction of rotation, the drive connection is directly from the gear 13, carrying the pulley 32, through the clutch to the driven sleeve 11. For the other direction of rotation, the drive is through the driving gear 13 and through an intermediate shaft and reversing gear to the driving gear 16 and thence to the pulley. For this purpose, a reversing gear 37 is keyed to a stub shaft 38 journalled in and between an end wall of the casing and a lug 39 and is in mesh with the driving gear 16, this gear 37 meshing with a pinion 40 keyed to the intermediate shaft 41 journalled in and extending between the respective end walls of the casing in appropriate ball bearings 42.

Another pinion 43 is keyed to the same shaft at its opposite end, this latter gear being in mesh with the driving gear 13 to which the pulley is keyed. Thus upon alternate connection of the respective gears to the sleeve, reverse directions of drive occur because of the idler gear interposed in the transmission from one gear to the other reversing the direction of drive to the respective gears.

Clutch construction

A clutch body 44 is secured upon the driven sleeve 11 between the gears 13 and 16 by means of a set screw 45 screwed radially into the clutch body and engaging the sleeve. A second screw 46 locks the screw 45 in place. A shiftable clutch actuating sleeve or collar 47 is slidably mounted on and keyed to the clutch body 44 (see Figure 5).

Between each gear and the adjacent side of the clutch body 44 a plurality of friction clutch plates 48 are interposed. Alternate plates of each group are fixed for rotation with each respective adjacent gear and the remaining plates of each group are fixed to the driven sleeve 11. In the instance of the last mentioned plates, the connection is accomplished by the engagement of notches 49 in the bores of the discs or clutch plates 48 with keys 50 disposed along the driven sleeve and splining these plates to the sleeve. In the instance of the plates attached to the gears, a plurality of studs 51, two being shown at diametrically opposite points in the present instance, are cast as integral parts of the gears and extend from the inner faces of the gears through notches 52 in the outer peripheries of each disc or plate. At the inner side of each set of clutch plates a thrust plate or washer 53 is slidably mounted upon the driven sleeve and keyed thereto by means of the keys 50 connecting the clutch body to the driven sleeve.

The clutch elements for frictionally engaging the clutch plates against the gears are included in the stationary body 44 fixed to the sleeve and the shiftable collar, surrounding the stationary body and slidable thereon, actuates these elements. Within the body, a plurality of levers 54 are mounted. These levers, of which there are six, are arranged in sets of three each for frictionally engaging each group of plates. The levers are mounted for pivotal movement in a radial direction relative to the device shaft and clutch body and are of the bell crank type mounted upon pivot pins 55 and moved within radial slots 56 in the outer periphery of the clutch body.

The levers of each group of three, circumferentially described, are spaced apart at 120° and are staggered relative to the elements of the other set or group. One end of each lever bears against the adjacent thrust plate or washer of the clutch and includes a rounded tip 57 for permitting an easy sliding movement of the end of the lever against the plate. The opposite end of each lever extends substantially parallel with the driven sleeve and includes an outwardly extended rounded tip 58 disposed beyond the confines of the clutch body. These tips are disposed within slots 59 in the adjacent ends of the bore of the shiftable clutch element and each bears against an inclined base wall of the particular slot. The groups of three levers are disposed in opposite directions for engaging the respective clutch plates.

The position described for these levers is the neutral transmission position assumed when the shiftable element 47 is in central position. As the shiftable element is moved in either direction, three of the levers are rocked on their pivots due to the forced engagement of the inclined wall with the extended tips of the levers and the thrust plates are forcibly engaged by the adjacent lever arms and urged against the clutch plates for clutching the adjacent gear and rotatively connecting the same to the fixed clutch body and the driven sleeve.

Clutch shifting and driven shaft braking mechanism

The means for actuating the shiftable clutch element 47 for moving it in opposite directions for reversing the drive to the sleeve includes a brake for smoothly stopping rotation of the clutch element and the driven sleeve after the power source has been unclutched. This momentum or free running of the sleeve must be quickly stopped so that the opposite direction of drive may be immediately started without throwing an undue load upon the clutch plates and parts such as would occur if the reverse plates were frictionally engaged for one direction while the driven sleeve was rotating in an opposite direction. It is, therefore, arranged that the operator may move the control lever from forward to reverse in one movement due to the action of the brake at the intermediate phase of movement.

A double lever arrangement for sliding the shiftable clutch element and operating the brake includes two semicircular or yoke shaped levers, 60, 61, the first or outer of which has its respective ends rotatably journalled in the walls of the casing and the second or inner of which has its respective ends rotatably mounted in the extended ends of the first mentioned lever. The inner lever moves within an annular groove 62 in the outer face of the shiftable clutch element and includes a semicircular brake band 63 fixed to its inner side for engaging the bottom of the groove.

The outer swinging lever has studs or trunnions 64—64 fixed in bores in its respective ends, which studs are in axial alignment. These studs or trunnions 64 have intermediate plate portions 65 which fit within cross grooves 66 in the outer faces of the respective ends of the lever or yoke 60 and are secured therein by means of screws 66ᵃ. The screws are locked in tightened position in each instance by means of a wire clip 67 of semicircular form disposed about a bossed portion of the yoke surrounding the trunnion and have inturned ends 68 extending through holes 69 in the ends of the plate portion of the stud or trunnion and engaged within the slots in the heads of the screws.

The outwardly extending ends of the trunnions are journalled in ball bearings 70 mounted in bearing supports or journal plates 71 bolted to the side walls of the casing. One of the trunnions extends through the particular plate to the exterior of the casing and has the clutch operating hand lever 72 attached thereto by means of a bolt 73 traversing a split portion of the lever surrounding the trunnion and engaged through a tangential semicircular slot 74 in the extended end of the trunnion.

Movement of the lever 60, therefore, rocks the yoke lever 60 on its aligned trunnions. The mounted ends of the yoke or semicircular lever extend below the trunnions and have studs 75 mounted therein extending inwardly or toward each other, these studs being secured in the lever 60 by means of cross pins 76 engaged through tangential slots 77 in the studs. The extended ends of the studs carry journal or slide blocks 78 in which they are rotatably mounted, the slide blocks being slidably mounted in slots 79 in the ends of the inner yoke shaped lever 61. These slide blocks are engaged by springs 80 under compression for forcing the same upwardly into the slots, the springs being disposed within bores 81 of the yoke and maintained in place by means of cotter pins 82 traversing the bores of the lever 61.

By virtue of the location of the pivot studs 75 connecting the inner yoke lever 61 to the outer yoke lever 60 below the trunnions 64 of the outer yoke lever, movement of the outer yoke lever on its trunnions shifts the inner yoke lever longitudinally of the axes of the driven sleeve and the clutch body. The inner yoke lever being disposed within the peripheral groove 62 in the shiftable clutch element 47, the effect of this longitudinal shifting of the yoke lever is to move the shiftable clutch element.

It will also be observed that as the operating lever is moved to one side or the other from a central or intermediate position, the pivotal mounting for the inner yoke lever is elevated being swung in an arc described from the center of the trunnions. The effect of this is to raise the brake band from contact with the base of the annular groove in the shiftable clutch element toward the limits of swing of the pivot pins 75.

Since the pivot pins 75 of the inner yoke lever are disposed in floating blocks under spring compression upwardly, the release of the brake from contact with its braking surface is gradual and for the same reason the application of the brake is gradual. Therefore, as the outer yoke lever is swung on its trunnions to either side, the inner yoke lever in engagement with the shiftable clutch element shifts the same through its engagement with the sides of the groove 62 and at the same time moves relative to the shiftable clutch element in a direction outwardly of the groove.

It will be observed that the springs under compression are effective for moving the slide blocks in their slots during a portion of these reverse clutching movements until the blocks engage the upper ends of the slots at which time the motion is transmitted to the yoke lever 61 and the brake band of the yoke lever clears the braking surface. At these times, the particular driving gear is clutched to a motionless sleeve or driven shaft.

*Clutch adjustment means*

The gears are definitely positioned against outward displacement occurring because of pressures imparted to the friction clutch plates and the gears. In this mechanism two types of adjustment are provided, one of which is for shifting the clutch body which is rigidly secured to the driven sleeve longitudinally of and between the gears for evenly spacing the clutch body between the gears, and the other of which is for the purpose of moving the gears closer together to take up for wearing of the friction clutch plates. It is arranged that all these adjustments are made from one end of the mechanism. The driven sleeve, carrying the clutch body, is therefore capable of longitudinal adjustment relative to the gears. This adjustment is possible for the further reason that the slidable toothed connection between the driven sleeve and the driven shaft section is provided.

For shifting the driven sleeve and the clutch body to the right, a rod 85 is extended through the tubular driven shaft. At the extreme inner end of the driven shaft or the end toward the driven shaft section, a head 86 is provided on this rod moving within an enlarged bore portion of the sleeve. This head has a cross slot 87 formed therein through which cross slot a cross key 88 is disposed. This cross key extending from both sides of the head includes a slot 89 intermediate its outer longitudinal side adapting the cross key to overhang and abut the respective sides of the head to prevent lateral displacement of the key.

To provide clearance for the extended ends of the key 88, the driven sleeve is diametrically slotted as at 90. This slot also provides clearance to the bearing 12 supporting the driven sleeve. The key 88 has notches 91 in its ends which are disposed about and abut the inner race of the bearing 12. The diametric slots 90 in the driven sleeve are of sufficient length to provide a clearance at each side of the abutment element.

The opposite end of the rod is screw threaded and extends from the end of the driven sleeve for carrying a nut 92 engaged against a washer 93 and the washer seated within that end of the driven sleeve. A cotter pin 94 is provided for locking this nut in set position.

For adjusting the driven sleeve and clutch body to the left to move the clutch body closer to the gear 13, the end of the sleeve engaged by the aforesaid nut 92 screwed onto the rod is provided with another adjustment nut 95 screwed onto the end of the sleeve and engaging an end thrust bearing 96 disposed against the end of the hub of the gear 13. It will be seen, by the foregoing description, that the driven sleeve is maintained against longitudinal displacement by the engagement of the cross key 88 with the bearing 12, being held thereagainst by the nut 94, and the engagement of the adjustment nut or collar 95 with the thrust bearing. The adjustment nut or collar 95 is maintained in the desired position by means of a set screw 97.

The hub cap or cover 33, screwed onto the hub of the gear 13, houses the adjustment nuts 94, 95 and is easily removable for access thereto. To adjust the clutch, the operator merely removes the cover and tightens the appropriate nut, first loosening the other nut. It will be seen that the nuts act against each other or in reverse directions, one pulling the sleeve in one direction and the other pulling it in reverse direction. It is, therefore, necessary to loosen one in order to tighten the other and after the clutch has been sufficiently shifted for adjustment to again set the loosened nut.

In the event that the clutch plates become worn and the space between the adjacent faces of the gears 13 and 16 becomes too great for efficient action of the clutch for frictionally engaging the plates against the gears, a further adjustment is provided which moves the gears closer together. The gear 13 is capable of being moved within the pulley 32, although keyed thereto, when the cap 33 has been removed and when the adjustment nuts have been loosened. Although it will be observed that the adjustment collar screwed onto the driven sleeve abuts against the end of the hub of the gear 13, this is accomplished through the medium of an end thrust bearing and the driven sleeve is relatively easily longitudinally adjusted. Should the gear 13 become accidentally displaced relative to the pulley 32 during the adjustment of the clutch between the gears, it may be immediately drawn back against the thrust bearing 96 and nut 95 when the cover or cap is replaced or screwed into position against the pulley.

*General description of operation*

Assuming the reversing gearing to be in neutral position, the power being effective to rotate pulley 32, this motion rotates the gear 13 in the same direction as the pulley. Through the intermediate shaft 41 and gearing 43, 40 and 37, the gear 16 is rotated in a reverse direction. The gears 13 and 16 are, therefore, constantly rotating in reverse directions when the pulley is being rotated and the driven sleeve and section coupled to the driven sleeve are stationary.

The operator, for either direction of rotation desired, grasps the hand lever 72 and shifts it in the appropriate direction. Movement of the hand lever rocks the yoke lever 60 on its trunnions, this movement swinging the pivot pins connected to the yoke 61 in an arc described from the bearing axes of the yoke 60. When the hand lever is in neutral position, the axes of the trunnions and pivot pins are vertically aligned and the inner yoke element 61 has been forced downwardly to the fullest extent. Therefore, at this neutral position the brake band 63 is engaging the bottom of the groove 62 in the shiftable clutch element 47 firmly holding this element in stationary position. As the movement of the pivot pins takes place, the shiftable clutch element is moved toward one gear or the other being slid on the clutch body 44 for depressing the particular set of three levers 54 and thrusting the clutch plates 48 engaged by the mentioned levers against the appropriate gear.

Prior to the frictional bind between the plates and the gear the inner yoke element has been elevated relative to the shiftable clutch element to lift the brake band from contact with the shiftable clutch element, the sides of the inner yoke element 61 still continuing to engage the sides of the groove for continued shifting of the shiftable clutch element. The floating blocks 78 journalling the pivot pins 75 in the inner yoke element 61 provide that the brake is released gradually and the abutment of the blocks with the ends of the grooves causes the braking band of the inner yoke lever 61 to be lifted from contact with the shiftable element 47. The hand lever may then be released, the shiftable clutch element remaining in off-set relation for a clutched drive.

If the operator should desire to quickly reverse the drive, he swings the hand lever from one side to the other and without pause through the neutral or intermediate position without damage to the mechanism since a full braking action occurs on the driven shaft as the shift passes through the intermediate position. It will be seen that the application of the brake is gradual due to the fact that first of all the brake band 63 is lowered into contact with the braking surface and upon continued swing of the pivot pins 75 of the inner yoke lever, the slide blocks 78 move against the compression springs 80 urging the brake under spring pressure against the braking surface, this pressure being greatest when the pivot pins and trunnions are in vertical alignment at exactly intermediate position. Thus in a rapid reversal of drive, both the application and release of the brake are gradual operations occurring automatically or as the lever is swung from one driving position to the reverse driving position.

Having described our invention, we claim:

1. In a reversing gear, a driven shaft, clutch operating levers mounted on said shaft, gears loosely rotatably mounted on the shaft at each side of the clutch, clutching elements interposed between the respective gears and the operating levers for alternate connection of the gears to the shaft, means mounted at one end of the shaft for adjusting the clutch operating levers relative to the gears, means for actuating the clutch levers, and means associated with the clutch actuating means for braking the driven shaft.

2. In a reversing gearing of the class described, a driven shaft, a pair of driving gears loosely mounted and spread apart on said shaft, a clutch body secured on said driven shaft, clutch fingers mounted in said body, clutch plates disposed between the clutch body and the respective gears, a shiftable sleeve for actuating said fingers and clutching said gears to the body, a lever for shifting said shiftable sleeve, a brake extending around said clutch element and disposed for engagement with the periphery thereof, and a yielding connection between the shifting means and the brake causing the brake to engage the clutch element in gradually increased pressure to the central point when the shiftable sleeve is in intermediate or neutral position.

3. In a reversing gear mechanism, a casing, a driven shaft extended through the walls of said casing, driving gears loosely rotatably mounted in spaced relation on said driven shaft, a clutch disposed between said gears for alternate connection to the respective gears, the driven element of said clutch fixed to the driven shaft, lever means for actuating the clutch, and an adjustment device, for adjustably shifting the driven shaft relative to the driving gears, disposed at the end of the driven shaft outside of the casing.

4. In a drive reversing mechanism, a driven shaft, reversely rotating driving gears loosely mounted upon said shaft in spaced relation, a clutch body fixed to said driven shaft against rotative and longitudinal displacement between said gears, clutch plates disposed between the clutch body and the respective gears, levers within the clutch body arranged in sets for frictionally engaging the respective plates at each side of the clutch body, means for alternately shifting the sets of levers for the respective directions of drive, and an adjustment means for adjusting the position of the clutch body intermediate the gears.

5. In a drive reversing mechanism, a driven shaft, reversely rotating driving gears loosely mounted upon said shaft, a clutch disposed between said gears and fixed to the shaft, said clutch adapted to alternately connect the respective gears to the driven shaft, a clutch shifting element slidably mounted upon the clutch, a shifting yoke lever journalled in the transmission casing, a second shifting yoke pivotally mounted in the first lever and having its pivots disposed below the pivots of the first lever, said second lever in connection with the shiftable element for moving the same longitudinally of the driven shaft, and a brake band disposed upon the second lever for engaging the sliding element at intermediate or neutral clutch position or when the pivots of the levers are in vertical alignment.

6. In a reversing gear mechanism of the class described, a transmission casing, a driven sleeve mounted through the walls of said transmission casing, driving gears loosely mounted upon said driven sleeve and rotatable in reverse directions, said gears spaced apart, a clutch mechanism affixed to the driven sleeve between the gears, an adjustment rod extending through the sleeve and abutting the transmission casing at one end, said rod having an adjustment nut at its other end disposed at the end of the driven sleeve, and an adjustment nut on the aforesaid end of the driven sleeve whereby the driven sleeve may be adjusted in either direction by means of the respective nuts disposed at the same end thereof.

7. In a clutch mechanism, an element to be driven, driving elements, a clutch for alternately connecting the respective driving elements to the driven element, a slidable element included in the clutch for actuating the same, said slidable element rotatively connected to the driven element, a shifting lever engaging said slidable element, means for imparting a swinging movement to said lever for raising the same, coincidentally with the shifting movement, relative to the surface of the shifting slidable element, and a braking surface formed on the inner face of the shifting lever for engaging the periphery of the slidable element at the lowest point of lever swing.

8. In a clutch mechanism, an element to be driven, driving elements, a clutch for alternately connecting the respective driving elements to the driven element, a slidable element for actuating the clutch, said element rotatively connected to said clutch, a shifting and braking lever engaging said slidable element, means for imparting movement to said lever for raising the same, coincidentally with the shifting movement and relative to the surface of the shifting slidable element, a brake band on the inner face of the shifting lever for engaging the periphery of the slidable element, and an operating lever yieldably connected to said shifting and braking lever.

9. In a reversing clutch, a pair of gears spaced apart and rotatively mounted, means for rotating said gears in reverse directions, a driven shaft extended through said gears, a clutch mounted on the driven shaft between the gears, and means disposed at one end of said shaft for centering the clutch relative to the gears.

10. In a reversing clutch, a casing, a pair of gears spaced apart and rotatively mounted in said casing, means for rotating said gears in reverse directions, a driven shaft extended through said gears, a clutch mounted on the driven shaft between the gears, and means disposed at one end of said shaft exteriorly of the casing for adjusting the clutch in either direction relative to the gears.

11. In a clutch mechanism, an element to be driven, driving elements, a clutch for alternately connecting the respective driving elements to the driven element, a slidable element for actuating the clutch, said element connected for rotation with said clutch, a shifting and braking lever engaging within the outer surface of said slidable element, operating means for imparting swinging movement to said lever for raising the same, coincidentally with the shifting movement, relative to the adjacent surface of the shifting slidable element, and a brake band formed on the inner face of the shiftable lever for engaging the adjacent surface of the slidable element.

In witness whereof we hereunto subscribe our names.

WILLIAM G. HOELSCHER.
ROBERT L. WILLIAMSON.